United States Patent
Ekanayake et al.

(10) Patent No.: US 9,863,285 B2
(45) Date of Patent: Jan. 9, 2018

(54) POWER GENERATION SYSTEM HAVING COMPRESSOR CREATING EXCESS GAS FLOW FOR SUPPLEMENTAL GAS TURBINE SYSTEM

(71) Applicant: General Electric Company, Schenectady, NY (US)

(72) Inventors: Sanji Ekanayake, Mableton, GA (US); Thomas John Freeman, Canton, GA (US); John David Memmer, Simpsonville, SC (US); Timothy Joseph Rehg, Simpsonville, SC (US); Alston Ilford Scipio, Mableton, GA (US)

(73) Assignee: General Electric Company, Schenectady, NY (US)

( * ) Notice: Subject to any disclaimer, the term of this patent is extended or adjusted under 35 U.S.C. 154(b) by 393 days.

(21) Appl. No.: 14/662,836

(22) Filed: Mar. 19, 2015

(65) Prior Publication Data

US 2016/0273402 A1    Sep. 22, 2016

(51) Int. Cl.
*F01K 23/10* (2006.01)
*F02C 6/02* (2006.01)
(Continued)

(52) U.S. Cl.
CPC ........... *F01K 23/10* (2013.01); *F02C 3/10* (2013.01); *F02C 6/00* (2013.01); *F02C 6/02* (2013.01);
(Continued)

(58) Field of Classification Search
CPC ...... F02C 3/10; F02C 6/00; F02C 6/02; F02C 6/08; F02C 9/18; F02C 6/18; F01K 23/10; Y02E 20/16
See application file for complete search history.

(56) References Cited

U.S. PATENT DOCUMENTS

| 4,163,365 A | 8/1979 | Frutschi |
| 5,063,963 A | 11/1991 | Smith |

(Continued)

FOREIGN PATENT DOCUMENTS

| DE | 102014111697 A1 | 3/2015 |
| EP | 2 204 554 A2 | 7/2010 |

(Continued)

OTHER PUBLICATIONS

European Search Report and Written opinion issued in connection with related EP Application No. 16160507.6 dated Jul. 22, 2016.

(Continued)

*Primary Examiner* — Pascal M Bui Pho
*Assistant Examiner* — Thuyhang Nguyen
(74) *Attorney, Agent, or Firm* — Ernest G. Cusick; Hoffman Warnick LLC

(57) ABSTRACT

A power generation system may include a generator; a gas turbine system for powering the generator, the gas turbine system including a turbine component, an integral compressor and a combustor to which air from the integral compressor and fuel are supplied, the combustor arranged to supply hot combustion gases to the turbine component, and the integral compressor having a flow capacity greater than an intake capacity of at least one of the combustor and the turbine component, creating an excess air flow. A first control valve system controls flow of the excess air flow along an excess air flow path to a supplemental gas turbine system. The excess air flow may be combusted with a fuel and supplied to the supplemental gas turbine system. An eductor may be positioned in the excess air flow path for using the excess air flow as a motive force to augment the excess air flow with additional gas.

13 Claims, 2 Drawing Sheets

(51) Int. Cl.
*F02C 6/00* (2006.01)
*F02C 6/18* (2006.01)
*F02C 9/18* (2006.01)
*F02C 3/10* (2006.01)
*F02C 6/08* (2006.01)

(52) U.S. Cl.
CPC .................. *F02C 6/08* (2013.01); *F02C 6/18* (2013.01); *F02C 9/18* (2013.01); *Y02E 20/14* (2013.01); *Y02E 20/16* (2013.01)

(56) References Cited

U.S. PATENT DOCUMENTS

| | | | |
|---|---|---|---|
| 5,934,064 | A | 8/1999 | Newby et al. |
| 6,141,955 | A | 11/2000 | Akiyama et al. |
| 6,430,915 | B1 * | 8/2002 | Wiant .................. F01K 23/067 60/39.12 |
| 6,442,941 | B1 | 9/2002 | Anand et al. |
| 6,543,234 | B2 | 4/2003 | Anand et al. |
| 6,550,253 | B2 * | 4/2003 | Mortzheim ........... F01D 17/105 60/782 |
| 6,615,574 | B1 * | 9/2003 | Marks ...................... F02C 7/18 60/772 |
| 6,718,771 | B1 | 4/2004 | Kopko |
| 7,143,573 | B2 * | 12/2006 | Hoffmann ............... F01K 23/10 60/39.182 |
| 8,240,153 | B2 | 8/2012 | Childers et al. |
| 8,479,523 | B2 | 7/2013 | Berry |
| 8,844,258 | B2 * | 9/2014 | Ekanayake ............. F02C 7/047 60/39.093 |
| 9,027,354 | B2 | 5/2015 | Velez |
| 2004/0045300 | A1 | 3/2004 | Dovali-Solis |
| 2006/0178782 | A1 | 8/2006 | Pechtl et al. |
| 2009/0094960 | A1 | 4/2009 | Eroglu et al. |
| 2010/0170218 | A1 | 7/2010 | Eluripati et al. |
| 2010/0242489 | A1 | 9/2010 | Saha et al. |
| 2011/0181050 | A1 | 7/2011 | Dinu |
| 2012/0137651 | A1 | 6/2012 | Taguchi et al. |
| 2013/0031910 | A1 | 2/2013 | Merchant et al. |
| 2013/0104519 | A1 | 5/2013 | Zhang et al. |
| 2013/0125557 | A1 | 5/2013 | Scipio et al. |
| 2013/0227954 | A1 | 9/2013 | Marini et al. |
| 2013/0327012 | A1 | 12/2013 | Mahabub et al. |
| 2014/0026588 | A1 | 1/2014 | Velez |
| 2014/0090354 | A1 | 4/2014 | Scipio et al. |
| 2014/0250902 | A1 | 9/2014 | Kraft |
| 2014/0352318 | A1 | 12/2014 | Kraft |
| 2015/0128597 | A1 | 5/2015 | Schlak |
| 2015/0251766 | A1 | 9/2015 | Atkey |
| 2015/0330869 | A1 | 11/2015 | Ziarno |
| 2016/0076461 | A1 | 3/2016 | Kawai et al. |

FOREIGN PATENT DOCUMENTS

| | | |
|---|---|---|
| EP | 2642087 A2 | 9/2013 |
| GB | 1 228 676 A | 4/1971 |
| WO | 93/11351 A1 | 6/1993 |
| WO | 2011/007303 A1 | 1/2011 |
| WO | 2013151909 A1 | 10/2013 |
| WO | 2014066276 A2 | 5/2014 |

OTHER PUBLICATIONS

Extended European Search Report and Opinion issued in connection with related EP Application No. 16160699.1 dated Aug. 8, 2016.
Extended European Search Report and Opinion issued in connection with related EP Application No. 16160459.0 dated Aug. 8, 2016.
Extended European Search Report and Opinion issued in connection with related EP Application No. 16160505.0 dated Aug. 16, 2016.
Extended European Search Report and Opinion issued in connection with related EP Application No. 16160368.3 dated Aug. 17, 2016.
Extended European Search Report and Opinion issued in connection with related EP Application No. 16159852.9 dated Aug. 18, 2016.
U.S. Appl. No. 14/662,814, filed Mar. 19, 2015, Ekanayake et al.
U.S. Appl. No. 14/662,822, filed Mar. 19, 2015, Ekanayake et al.
U.S. Appl. No. 14/662,828, filed Mar. 19, 2015, Ekanayake et al.
U.S. Appl. No. 14/662,847, filed Mar. 19, 2015, Ekanayake et al.
U.S. Appl. No. 14/662,851, filed Mar. 19, 2015, Ekanayake et al.
U.S. Appl. No. 14/662,858, filed Mar. 19, 2015, Ekanayake et al.
U.S. Appl. No. 14/662,751, filed Mar. 19, 2015, Ekanayake et al.
U.S. Appl. No. 14/662,828, Office Action 1 dated Feb. 24, 2017, 28 pages.
U.S. Appl. No. 14/662,851, Office Action 1 dated Mar. 14, 2017, 37 pages.
U.S. Appl. No. 14/662,751, Office Action 1 dated Mar. 15, 2017, 33 pages.
U.S. Appl. No. 14/662,814, Office Action 1 dated Mar. 21, 2017, 33 pages.
U.S. Appl. No. 14/662,847, Office Action 1 dated Mar. 21, 2017, 34 pages.
U.S. Appl. No. 14/662,822, Office Action 1 dated Apr. 20, 2017, 36 pages.
U.S. Appl. No. 14/797,240, filed Jul. 13, 2015, Stapleton et al.
U.S. Appl. No. 14/662,858, Office Action 1 dated Jun. 14, 2017, 40 pages.
U.S. Appl. No. 14/662,751, Final Office Action dated Aug. 23, 2017, 32 pages.
U.S. Appl. No. 14/662,828, Final Office Action dated Aug. 23, 2017, 28 pages.
U.S. Appl. No. 14/662,851, Final Office Action 1 dated Aug. 24, 2017, 38 pages.
U.S. Appl. No. 14/662,814, Final Office Action 1 dated Aug. 25, 2017, 34 pages.
U.S. Appl. No. 14/662,847, Final Office Action 1 dated Aug. 25, 2017, 35 pages.
U.S. Appl. No. 14/662,822, Final Office Action dated Sep. 26, 2017, 34 pages.
U.S. Appl. No. 14/662,858, Final Office Action 1 dated Oct. 19, 2017, 27 pages.

\* cited by examiner

POWER GENERATION SYSTEM HAVING COMPRESSOR CREATING EXCESS GAS FLOW FOR SUPPLEMENTAL GAS TURBINE SYSTEM

CROSS-REFERENCE TO RELATED APPLICATIONS

This application is related to co-pending U.S. application numbers: application Ser. No. 14/662,814, application Ser. No. 14/662,822, application Ser. No. 14/662,828, application Ser. No. 14/662,847, application Ser. No. 14/662,851, application Ser. No. 14/662,858, application Ser. No. 14/662,751, all filed on Mar. 19, 2015.

BACKGROUND OF THE INVENTION

The disclosure relates generally to power generation systems, and more particularly, to a power generation system including a gas turbine system having a compressor creating an excess air flow for use with a supplemental gas turbine system.

Power generation systems oftentimes employ one or more gas turbine systems, which may be coupled with one or more steam turbine systems, to generate power. A gas turbine system may include a multi-stage axial flow compressor having a rotating shaft. Air enters the inlet of the compressor and is compressed by the compressor blade stages and then is discharged to a combustor where fuel, such as natural gas, is burned to provide a high energy combustion gas flow to drive a turbine component. In the turbine component, the energy of the hot gases is converted into work, some of which may be used to drive the integral compressor through a rotating shaft, with the remainder available for useful work to drive a load such as a generator via a rotating shaft (e.g., an extension of the rotating shaft) for producing electricity. A number of gas turbine systems may be employed in parallel within a power generation system. In a combined cycle system, one or more steam turbine systems may also be employed with the gas turbine system(s). In this setting, a hot exhaust gas from the gas turbine system(s) is fed to one or more heat recovery steam generators (HRSG) to create steam, which is then fed to a steam turbine component having a separate or integral rotating shaft with the gas turbine system(s). In any event, the energy of the steam is converted into work, which can be employed to drive a load such as a generator for producing electricity.

When a power generation system is created, its parts are configured to work together to provide a system having a desired power output. The ability to increase power output on demand and/or maintain power output under challenging environmental settings is a continuous challenge in the industry. For example, on hot days, the electric consumption is increased, thus increasing power generation demand. Another challenge of hot days is that as temperature increases, compressor flow decreases, which results in decreased generator output. One approach to increase power output (or maintain power output, e.g., on hot days) is to add components to the power generation system that can increase air flow to the combustor of the gas turbine system(s). One approach to increase air flow is adding a storage vessel to feed the gas turbine combustor. This particular approach, however, typically requires a separate power source for the storage vessel, which is not efficient.

Another approach to increasing air flow is to upgrade the compressor. Currently, compressors have been improved such that their flow capacity is higher than their predecessor compressors. These new, higher capacity compressors are typically manufactured to either accommodate new, similarly configured combustors, or older combustors capable of handling the increased capacity. A challenge to upgrading older gas turbine systems to employ the newer, higher capacity compressors is that there is currently no mechanism to employ the higher capacity compressors with systems that cannot handle the increased capacity without upgrading other expensive parts of the system. Other parts that oftentimes need to be upgraded simultaneously with a compressor upgrade include but are not limited to the combustor, gas turbine component, generator, transformer, switchgear, HRSG, steam turbine component, steam turbine control valves, etc. Consequently, even though a compressor upgrade may be theoretically advisable, the added costs of upgrading other parts renders the upgrade ill-advised due to the additional expense.

BRIEF DESCRIPTION OF THE INVENTION

A first aspect of the disclosure provides a power generation system, comprising: a generator; a gas turbine system for powering the generator, the gas turbine system including a turbine component, an integral compressor and a combustor to which air from the integral compressor and fuel are supplied, the combustor arranged to supply hot combustion gases to the turbine component, and the integral compressor having a flow capacity greater than an intake capacity of at least one of the combustor and the turbine component, creating an excess air flow; a supplemental gas turbine system including a supplemental combustor arranged to supply hot combustion gases to a supplemental turbine component thereof, the supplemental turbine component operatively coupled to a supplemental generator; and a first control valve system controlling flow of the excess air flow along an excess air flow path, wherein the excess air flow path feeds the excess air flow to an intake of the supplemental combustor, and the supplemental combustor combusts the excess air flow with a fuel to create the hot combustion gases for the supplemental turbine component.

A second aspect of the disclosure provides a method, comprising: powering a generator using a gas turbine system including a turbine component, an integral compressor and a combustor to which air from the integral compressor and fuel are supplied, the combustor arranged to supply hot combustion gases to the turbine component, and the integral compressor having a flow capacity greater than an intake capacity of at least one of the combustor and the turbine component, creating an excess air flow; powering a supplemental generator using a supplemental gas turbine system including a supplemental combustor arranged to supply hot combustion gases to a supplemental turbine component thereof, the supplemental turbine component operatively coupled to the supplemental generator; and extracting the excess air flow from the gas turbine system and directing the excess air flow to an intake of the supplemental combustor, the supplemental combustor combusting the excess air flow with a fuel to create the hot combustion gases for the supplemental turbine component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure, in which.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure provides a power generation system including a gas turbine system including a compressor that creates an excess air flow. Embodiments of the invention provide ways to employ the excess air flow to improve output and value of the power generation system.

Figure 1:
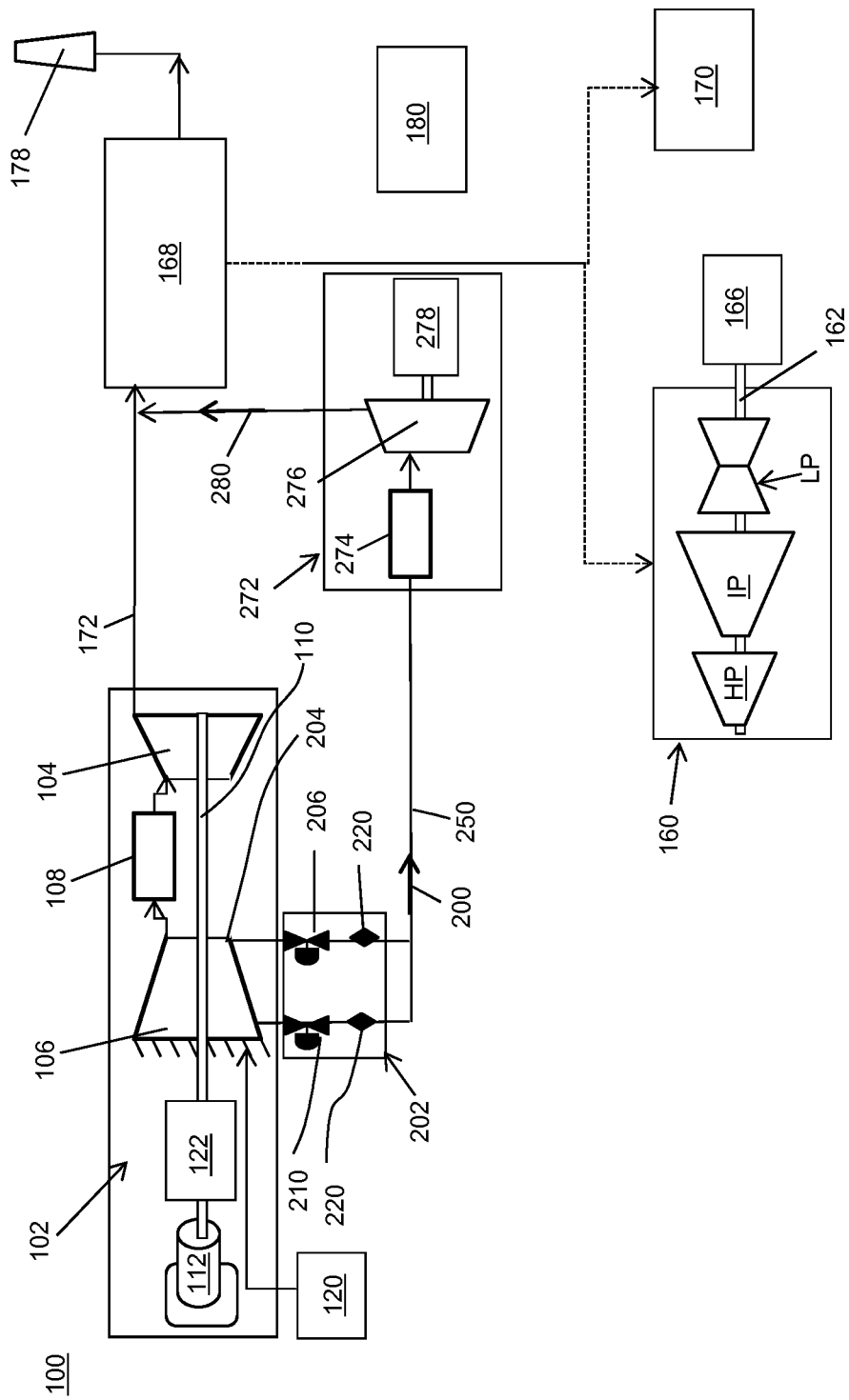
FIG. 1 shows a schematic diagram of a power generation system according to embodiments of the invention.

Referring to FIG. 1, a schematic diagram of a power generation system 100 according to embodiments of the invention is provided. System 100 includes a gas turbine system 102. Gas turbine system 102 may include, among other components, a turbine component 104, an integral compressor 106 and a combustor 108. As used herein, "integral" compressor 106 is so termed as compressor 106 and turbine component 104 may be integrally coupled together by, inter alia, a common compressor/turbine rotating shaft 110 (sometimes referred to as rotor 110). This structure is in contrast to many compressors that are separately powered, and not integral with turbine component 104.

Combustor 108 may include any now known or later developed combustor system generally including a combustion region and a fuel nozzle assembly. Combustor 108 may take the form of an annular combustion system, or a can-annular combustion system (as is illustrated in the figures). In operation, air from integral compressor 106 and a fuel, such as natural gas, are supplied to combustor 108. Diluents may also be optionally delivered to combustor 108 in any now known or later developed fashion. Air drawn by integral compressor 106 may be passed through any now known or later developed inlet filter housing 120. As understood, combustor 108 is arranged to supply hot combustion gases to turbine component 104 by combustion of the fuel and air mixture. In turbine component 104, the energy of the hot combustion gases is converted into work, some of which may be used to drive compressor 106 through rotating shaft 110, with the remainder available for useful work to drive a load such as, but not limited to, a generator 122 for producing electricity, and/or another turbine via rotating shaft 110 (an extension of rotating shaft 110). A starter motor 112 such as but not limited to a conventional starter motor or a load commutated inverter (LCI) motor (shown) may also be coupled to rotating shaft 110 for starting of gas turbine system 102 in any conventional fashion. Turbine component 104 may include any now known or later developed turbine for converting a hot combustion gas flow into work by way of rotating shaft 110.

In one embodiment, gas turbine system 102 may include a model MS7001FB, sometimes referred to as a 7FB engine, commercially available from General Electric Company, Greenville, S.C. The present invention, however, is not limited to any one particular gas turbine system and may be implemented in connection with other systems including, for example, the MS7001FA (7FA) and MS9001FA (9FA) models of General Electric Company.

In contrast to conventional gas turbine system models, integral compressor 106 has a flow capacity greater than an intake capacity of turbine component 104 and/or first combustor 108. That is, compressor 106 is an upgraded compressor compared to a compressor configured to match combustor 108 and turbine component 104. As used herein, "capacity" indicates a flow rate capacity. For example, an initial compressor of gas turbine system 102 may have a maximum flow rate capacity of about 487 kilogram/second (kg/s) (1,075 pound-mass/second (lbm/s)) and turbine component 104 may have a substantially equal maximum flow capacity, i.e., around 487 kg/s. Here, however, compressor 106 has replaced the initial compressor and may have an increased maximum flow capacity of, for example, about 544 kg/s (1,200 lbm/s), while turbine component 104 continues to have a maximum flow capacity of, e.g., around 487 kg/s. (Where necessary, starter motor 112 may also have been upgraded, e.g., to an LCI motor as illustrated, to accommodate increased power requirements for startup of integral compressor 106). Consequently, turbine component 104 cannot take advantage of all of the capacity of compressor 106, and an excess air flow 200 is created by compressor 106 above a maximum capacity of, e.g., turbine component 104. Similarly, the flow capacity of integral compressor 106 may exceed the maximum intake capacity of combustor 108. In a similar fashion, the power output of turbine component 104 if exposed to the full flow capacity of integral compressor 106 could exceed a maximum allowed input for generator 122. While particular illustrative flow rate values have been described herein, it is emphasized that the flow rate capacities may vary widely depending on the gas turbine system and the new, high capacity integral compressor 106 employed. As will be described herein, the present invention provides various embodiments for power generation system 100 to employ the excess air flow in other parts of power generation system 100.

As also shown in FIG. 1, in one embodiment, power generation system 100 may optionally take the form of a combined cycle power plant that includes a steam turbine system 160. Steam turbine system 160 may include any now known or later developed steam turbine arrangement. In the example shown, high pressure (HP), intermediate pressure (IP) and low pressure (LP) sections are illustrated; however, not all are necessary in all instances. As known in the art, in operation, steam enters an inlet of the steam turbine section(s) and is channeled through stationary vanes, which direct the steam downstream against blades coupled to a rotating shaft 162 (rotor). The steam may pass through the remaining stages imparting a force on the blades causing rotating shaft 162 to rotate. At least one end of rotating shaft 162 may be attached to a load or machinery such as, but not limited to, a generator 166, and/or another turbine, e.g., a gas turbine system 102 or another gas turbine system. Steam for steam turbine system 160 may be generated by one or more steam generators 168, i.e., heat recovery steam generators (HRSGs). HRSG 168 may be coupled to, for example, an exhaust 172 of gas turbine system 102. After passing through HRSG 168, the combustion gas flow, now depleted of heat, may be exhausted via any now known or later developed emissions control system 178, e.g., stacks, selective catalytic reduction (SCR) units, nitrous oxide filters, etc. While FIG. 1 shows a combined cycle embodiment, it is emphasized that steam turbine system 160 including HRSG 168 may be omitted. In this latter case, exhaust 172 would be passed directly to emission control system 178 or used in other processes.

Power generation system 100 may also include any now known or later developed control system 180 for controlling the various components thereof. Although shown apart from the components, it is understood that control system 180 is electrically coupled to all of the components and their respective controllable features, e.g., valves, pumps, motors, sensors, gearing, generator controls, etc.

Returning to details of gas turbine system 102, as noted herein, integral compressor 106 has a flow capacity greater than an intake capacity of turbine component 104 and/or combustor 108, which creates an excess air flow 200. As illustrated, excess air flow 200 may be formed by extracting air from compressor 106. In one embodiment, a first control valve system 202 controls flow of excess air flow 200 along an excess gas flow path 250 to a supplemental gas turbine system 272. First control valve system 202 may include any number of valves necessary to supply the desired excess air flow 200, e.g., one, two (as shown) or more than two. In one embodiment, excess air flow 200 may be extracted from integral compressor 106 at a discharge 204 thereof using a compressor discharge control valve 206. That is, compressor discharge control valve 206 controls a first portion of excess air flow 200 taken from discharge 204 of integral compressor 106. In this case, another upstream valve 210 may be omitted. In another embodiment, however, excess air flow 200 may be extracted at one or more stages of compressor 106 where desired, e.g., at one or more locations upstream of discharge 204, at discharge 204 and one or more locations upstream of the discharge, etc., using appropriate valves and related control systems. In this case, first control valve system 202 may further include one or more upstream control valves 210 controlling a second portion of excess air flow 200 taken from a stage(s) of integral compressor 106 upstream from discharge 204. Any number of upstream control valve(s) 210 may be employed in first control valve system 202 to provide any desired excess air flow 200 from integral compressor 106, i.e., with a desired pressure, flow rate, volume, etc. Compressor discharge valve 210 can be omitted where other upstream control valve(s) 210 provide the desired excess air flow 200. First control valve system 202 may also include at least one sensor 220 for measuring a flow rate of each portion of the excess air flow, each sensor 220 may be operably coupled to a respective control valve or an overall control system 180. Control valve system 202 may include any now known or later developed industrial control for automated operation of the various control valves illustrated.

Excess air flow 200 eventually passes along an excess gas flow path 250, which may include one or more pipes, to a supplemental gas turbine system 272. Although illustrated as if excess air flow 200 is directed to supplemental gas turbine system 272 in a single conduit, it is understood that the excess air flow may be directed to one or more locations of system 272. Supplemental gas turbine system 272 may include a supplemental combustor 274 arranged to supply hot combustion gases to a supplemental turbine component 276. Supplemental combustor 274 may include any form of combustor described relative to combustor 108 that is capable of using excess air flow 200 (or augmented excess gas flow 270 (FIG. 2) (described herein)) to create and supply hot combustion gases for supplemental turbine component 276. Similarly, supplemental turbine component 276 may include any form of turbine component described relative to turbine component 104. As illustrated, supplemental turbine component 276 is operatively coupled to a supplemental generator 278, which may be referred to herein as a "supplemental generator" as it may be different than generator 122 coupled to gas turbine system 102. Supplemental generator 278 may also be different than generator 166 of steam turbine system 160. In an alternative embodiments, generator 274 may be the same as generator 122 or generator 166. In any event, excess air flow 200 (or augmented excess gas flow 270 (FIG. 2)) may be employed to generate power via supplemental gas turbine system 272, thus employing the excess capacity of integral compressor 106 in an efficient manner. An exhaust 280 of supplemental gas turbine system 272 may be delivered to an exhaust 172 of turbine component 104 for use in creating steam in HRSG 168.

Figure 2:
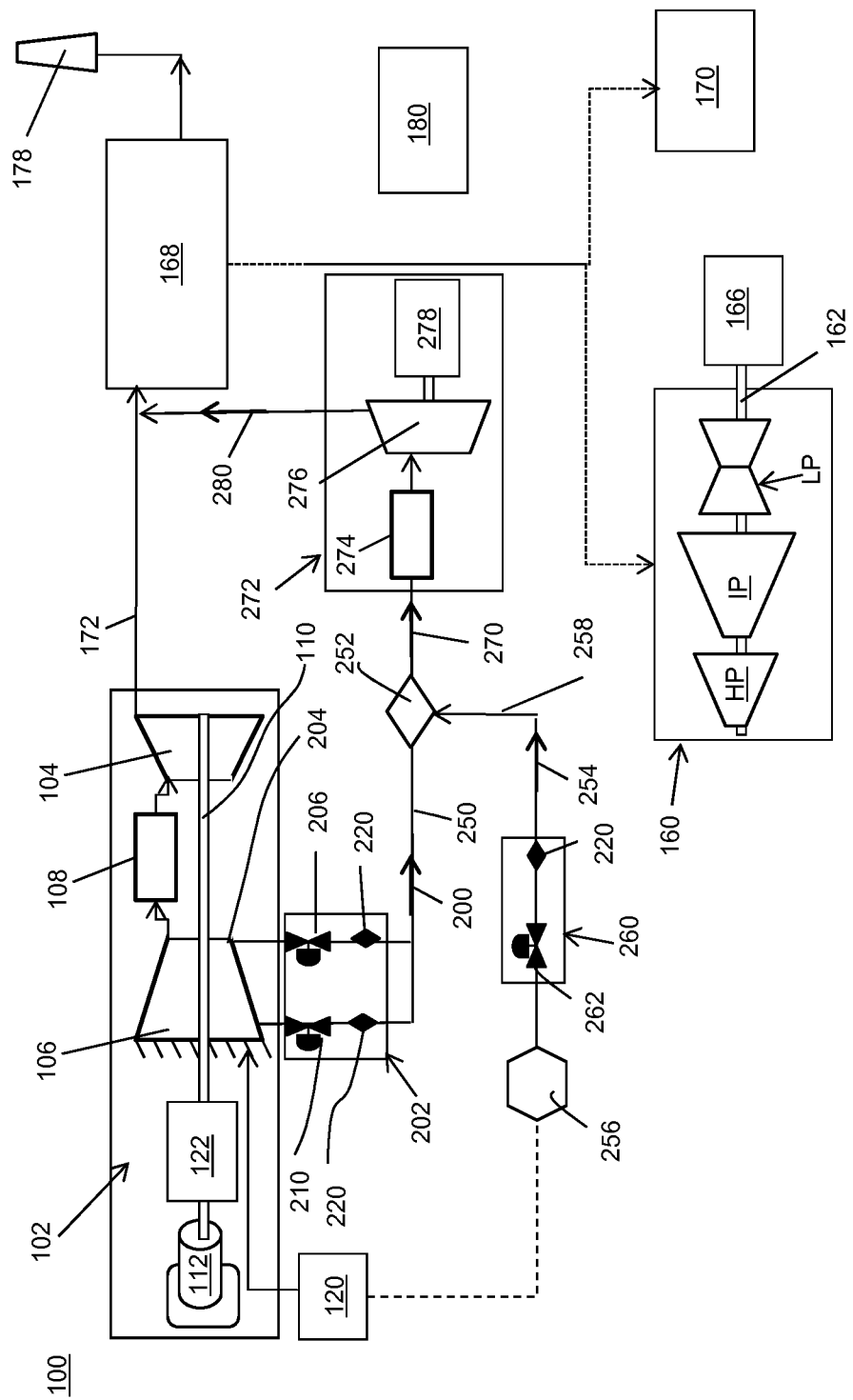
FIG. 2 shows a schematic diagram of a power generation system including an eductor according to embodiments of the invention.

Referring to FIG. 2, power generation system 100 may also optionally include an eductor 252 positioned in excess gas flow path 250 for using excess air flow 200 as a motive force to augment the excess air flow with additional gas 254. Additional gas 254 with excess air flow 200 form an augmented excess gas flow 270 that is delivered to supplemental gas turbine system 272. That is, augmented excess gas flow 270 is supplied to supplemental gas turbine system 272. Augmented excess gas flow 270 provides increased total air/gas mass to supplemental combustor 274, and may allow for additional power to be generated using generator 278. Additional mass flow to HRSG 168 via exhaust 280 may also be recognized, increasing HRSG 168 steam production.

Eductor 252 may take the form of any pump that uses a motive fluid flow to pump a suction fluid, i.e., additional gas 254. Here, eductor 252 uses excess air flow 200 as a motive fluid to add additional gas 254 to excess air flow 200, i.e., by suctioning in the additional gas, from an additional gas source 256 along a suction side flow path 258. Additional gas source 256 may take a variety of forms. In one embodiment, additional gas source 256 may take the form of inlet filter housing 120 of integral compressor 106. In this case, suction side flow path 258 to eductor 252 may be coupled to inlet filter housing 120 of integral compressor 106 (shown by dashed line) such that additional gas 254 includes ambient air. Here, additional gas 254 is in the form of ambient air. In another embodiment, additional gas 254 may include ambient air from an additional gas source 256 other than inlet filter housing 120, e.g., another filter housing, air directly from the environment but later filtered within flow path 258, etc. In either of the aforementioned embodiments, augmented excess gas flow 270 includes mostly air, i.e., it is an augmented excess air flow. In another embodiment, however, additional gas 254 may include a process gas such as but not limited to synthesis ("syn-gas") from a refinery, blast-furnace gas, methane from a waste pile/dump, etc. Additional gas 254, in another embodiment, may also include exhaust from an engine, e.g., from a combustion engine, a diesel engine, another gas turbine system, etc. A second control valve system 260 may be provided in suction side flow path 258 for controlling a flow of additional gas 254 into eductor 252. Second control valve system 260 may include a control valve 262 that may operate to control the amount of additional gas 254 into eductor 252. Second control valve system 260 may also include at least one sensor 220 for measuring a flow rate of additional gas 254 in suction side flow path 258, the sensor operably coupled to second control valve system 260 for measuring a flow rate of additional gas 254.

As also illustrated, an exhaust 172 of turbine component 104 may be fed to HRSG 168 for creating steam for steam turbine system 160. Where exhaust 280 of supplemental gas turbine system 272 is as hot as exhaust 172 of turbine component 104 or hotter, it may be added to exhaust 172 for more efficiently creating steam in HRSG 168. Where exhaust 280 of supplemental gas turbine system 272 is not hotter than exhaust 172 of turbine component 104, it may be used to increase mass flow and to the HRSG 168 or elsewhere in power generation system 100 or exhausted by way of emissions control system 178, skipping HRSG 168. As illustrated, HRSG 168 may also feed steam to a co-generation steam load 170. Co-generation steam load 170 may include, for example, steam to a petro-chemical facility, steam for district heating, steam for "tar-sands" oil extraction, etc.

With further regard to each control valve system 202, 260, each control valve thereof may be positioned in any position between open and closed to provide the desired partial flows to the stated components. Further, while one passage to each component is illustrated after each control valve, it is emphasized that further piping and control valves may be provided to further distribute the respective portion of excess air flow 200 to various sub-parts, e.g., numerous inlets to eductor 252, etc. Each sensor 220 may be operably coupled to control valve system(s) 202, 260 and control system 180 for automated control in a known fashion. Other sensors 220 for measuring flow can be provided where necessary throughout power generation system 100. Control valve systems 202, 260 and hence flow of excess air flow 200 and operation of eductor 252 may be controlled using any now known or later developed industrial controller, which may be part of an overall power generation system 100 control system 180. Control system 180 may control operation of all of the various components of power generation system 100 in a known fashion, including controlling control valve systems 202, 260.

Power generation system 100 including gas turbine system 102 having integral compressor 106 that creates an excess air flow 200 that provides a number of advantages compared to conventional systems. For example, compressor 106 may improve the power block peak, base and hot-day output of power generation system 100 at a lower cost relative to upgrading all compressors in the system, which can be very expensive where a number of gas turbines are employed. In addition embodiments of the invention, reduce the relative cost of an upgraded compressor, i.e., compressor 106, and in-turn improves the viability and desirability of an upgraded compressor by providing a way to efficiently consume more of the excess air flow. Further, power generation system 100 including integral compressor 106 expands the operational envelope of system 100 by improving project viability in the cases where any one or more of the following illustrative sub-systems are undersized: turbine component 104, generator 122, transformer (not shown), switchgear, HRSG 168, steam turbine system 160, steam turbine control valves, etc. In this fashion, system 100 provides an improved case to upgrade a single compressor in, for example, a single gas turbine and single steam turbine combined cycle (1×1 CC) system as compared to the do-nothing case. Where eductor 252 (FIG. 2), the aforementioned advantages of augmented excess gas flow 270 to supplemental gas turbine system 272 such as additional mass flow and additional power generation may be recognized. Additional mass flow to HRSG 168 may also be achieved using eductor 252.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A power generation system, comprising:
   a generator;
   a gas turbine system for powering the generator, the gas turbine system including a turbine component, an integral compressor, a combustor to which air from the integral compressor and fuel are supplied, and a first rotatable shaft coupled to the gas turbine system, the combustor arranged to supply hot combustion gases to the turbine component, and the integral compressor having a flow capacity greater than an intake capacity of at least one of the combustor and the turbine component, creating an excess air flow;
   a supplemental gas turbine system including a second rotatable shaft and a supplemental combustor arranged to supply hot combustion gases of the supplemental combustor to a supplemental turbine component thereof, the supplemental turbine component operatively coupled to a supplemental generator;
   a first control valve system controlling flow of the excess air flow along an excess air flow path; and
   an eductor positioned in the excess air flow path for using the excess air flow as a motive force to augment the excess air flow with additional gas, the educator creating an augmented excess gas flow,
   wherein the excess air flow path feeds the augmented excess gas flow directly to the intake of the supplemental combustor, and the supplemental combustor combusts the augmented excess gas flow with the fuel to create the hot combustion gases of the supplemental combustor for the supplemental turbine component;
   wherein an exhaust of the turbine component feeds a heat recovery steam generator (HRSG) for creating steam for a steam turbine system, the steam turbine system including a third rotatable shaft; and
   wherein the first, second, and third rotatable shafts are not within one another.

2. The power generation system of claim 1, wherein the HRSG also feeds steam to a co-generation steam load.

3. The power generation system of claim 1, wherein the first control valve system includes a compressor discharge control valve controlling a first portion of the excess air flow taken from a discharge of the integral compressor, and an upstream control valve controlling a second portion of the excess air flow taken from a stage of the integral compressor upstream from the discharge.

4. The power generation system of claim 3, further comprising at least one sensor for measuring a flow rate of each portion of the excess air flow, each sensor operably coupled to a respective control valve.

5. The power generation system of claim 1, wherein the eductor includes a suction side flow path, and further comprising a second control valve system in the suction side flow path controlling a flow of the additional gas into the eductor.

6. The power generation system of claim 5, wherein the suction side flow path is fluidly coupled to an inlet filter of the integral compressor.

7. The power generation system of claim 1, further comprising a sensor for measuring a flow rate of the additional gas in a suction side flow path of the eductor, the sensor operably coupled to the second control valve system.

8. The power generation system of claim 1, wherein a suction side flow path of the eductor is fluidly coupled to an inlet filter of the integral compressor.

9. The power generation system of claim 1, wherein the generator that is different than the supplement generator.

10. The power generation system of claim 1, wherein the additional gas includes ambient air.

11. The power generation system of claim 1, wherein the additional gas includes a process gas.

12. The power generation system of claim 1, wherein the additional gas includes a synthesis gas.

13. The power generation system of claim 1, wherein the additional gas includes exhaust from an engine.

* * * * *